(12) United States Patent
Thakkar et al.

(10) Patent No.: US 8,316,089 B2
(45) Date of Patent: Nov. 20, 2012

(54) TECHNIQUES TO MANAGE MEDIA CONTENT FOR A MULTIMEDIA CONFERENCE EVENT

(75) Inventors: Pulin Thakkar, Redmond, WA (US); Noor-E-Gagan Singh, Redmond, WA (US); Stuti Jain, Redmond, WA (US); Avronil Bhattacharjee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 478 days.

(21) Appl. No.: 12/115,556

(22) Filed: May 6, 2008

(65) Prior Publication Data

US 2009/0282103 A1 Nov. 12, 2009

(51) Int. Cl.
*G06F 15/16* (2006.01)
*H04N 7/14* (2006.01)
*H04L 12/16* (2006.01)
*G06F 3/00* (2006.01)

(52) U.S. Cl. ............... 709/205; 709/204; 348/14.01; 370/259; 715/733

(58) Field of Classification Search ............. 709/204, 709/205; 370/259; 715/733–759
See application file for complete search history.

(56) References Cited

U.S. PATENT DOCUMENTS

| | | | |
|---|---|---|---|
| 5,473,367 A | 12/1995 | Bales et al. | |
| 5,767,897 A | 6/1998 | Howell | |
| 5,801,756 A * | 9/1998 | Iizawa | 348/14.11 |
| 5,953,050 A * | 9/1999 | Kamata et al. | 348/14.09 |
| 6,128,649 A * | 10/2000 | Smith et al. | 709/217 |
| 6,414,707 B1 * | 7/2002 | Agraharam et al. | 348/14.07 |
| 6,456,335 B1 * | 9/2002 | Miura et al. | 348/588 |
| 6,577,333 B2 * | 6/2003 | Tai et al. | 348/14.08 |
| 6,922,718 B2 * | 7/2005 | Chang | 709/204 |
| 6,989,856 B2 * | 1/2006 | Firestone et al. | 348/14.09 |
| 7,081,915 B1 * | 7/2006 | Hamilton | 348/14.08 |
| 7,185,054 B1 | 2/2007 | Ludwig et al. | |
| 7,242,421 B2 * | 7/2007 | Center et al. | 348/14.1 |
| 7,362,350 B2 * | 4/2008 | Cutler | 348/14.12 |
| 7,577,246 B2 * | 8/2009 | Idan et al. | 379/265.01 |
| 2005/0099492 A1 * | 5/2005 | Orr | 348/14.08 |
| 2006/0092269 A1 | 5/2006 | Baird et al. | |
| 2007/0035470 A1 | 2/2007 | Lee et al. | |
| 2007/0140465 A1 * | 6/2007 | Erhart et al. | 379/235 |
| 2007/0206091 A1 | 9/2007 | Dunn et al. | |
| 2007/0229652 A1 * | 10/2007 | Center et al. | 348/14.08 |
| 2007/0299981 A1 | 12/2007 | Baird | |

OTHER PUBLICATIONS

ITU-T Recommendations H.248.19—Amendment 1, approved Apr. 2006.*
International Search Report for PCT/US2009/040926, mailed Dec. 17, 2009, 3 pages.
Buxton, et al., "Interfaces for multiparty videoconferencing", (1997)In K. Finn, A. Sellen & S. Wilber (Eds.). Video Mediated Communication. Hillsdale, N.J.: Erlbaum, pp. 385-400. http://66.102.1.104/scholar?hl=en&lr=&q=cache:WGWEdpgUupsJ:www.alias.com/eng/about/research/papers/file/multiparty.pdf++multi+party+video+conference.
Johanson, "Smile!—A Multimedia Communication Framework for Distributed Collaboration", Dated: 2002, pp. 1-12. Okada, et al., "Multiparty Videoconferencing at Virtual Social Distance: MAJIC Design", Proceedings of the 1994 ACM conference on Computer supported cooperative work, Chapel Hill, North Carolina, US, Year of Publication: 1994, pp. 385-393.

* cited by examiner

Primary Examiner — David Lazaro
Assistant Examiner — Vitali Korobov (57) ABSTRACT

Techniques to manage media content for a multimedia conference event are described. An apparatus may comprise a media content manager component operative to generate a visual composition of decoded media streams for a multimedia conference event. If it is determined that the total number of decoded media streams is greater than the total number of available display frames in a visual composition then an active group of decoded media streams may be selected from among the total number of decoded media streams for mapping to the available display frames based on speech activity. Other embodiments are described and claimed.

11 Claims, 7 Drawing Sheets

DECODE MULTIPLE MEDIA STREAMS FOR A MULTIMEDIA CONFERENCE EVENT
*402*

DETERMINE A TOTAL NUMBER OF DECODED MEDIA STREAMS IS GREATER THAN A TOTAL NUMBER OF AVAILABLE DISPLAY FRAMES IN A VISUAL COMPOSITION
*404*

SELECT AN ACTIVE GROUP OF DECODED MEDIA STREAMS FROM AMONG THE TOTAL NUMBER OF DECODED MEDIA STREAMS FOR MAPPING TO THE AVAILABLE DISPLAY FRAMES BASED ON SPEECH ACTIVITY
*406*

STORAGE MEDIUM 602

LOGIC 604

*FIG. 6*

TECHNIQUES TO MANAGE MEDIA CONTENT FOR A MULTIMEDIA CONFERENCE EVENT

BACKGROUND

A multimedia conference system typically allows multiple participants to communicate and share different types of media content in a collaborative and real-time meeting over a network. The multimedia conference system may display different types of media content using various graphical user interface (GUI) windows or views. For example, one GUI view might include video images of participants, another GUI view might include presentation slides, yet another GUI view might include text messages between participants, and so forth. In this manner various geographically disparate participants may interact and communicate information in a virtual meeting environment similar to a physical meeting environment where all the participants are within one room.

In a virtual meeting environment, however, it may be difficult to display all of the various participants of a meeting. This problem typically increases as the number of meeting participants increase, since some participants may be speaking while not being displayed, or vice-versa, thereby potentially leading to confusion and awkwardness among the participants Furthermore, it may be difficult to identify a particular speaker at any given moment in time, particularly when multiple participants are speaking simultaneously or in rapid sequence. Techniques directed to improving display techniques in a virtual meeting environment may therefore enhance user experience and convenience.

SUMMARY

Various embodiments may be generally directed to multimedia conference systems. Some embodiments may be particularly directed to techniques to generate a visual composition for a multimedia conference event. The multimedia conference event may include multiple participants, some of which may gather in a conference room, while others may participate in the multimedia conference event from a remote location.

In one embodiment, for example, an apparatus such as a meeting console may comprise a display and a media content manager component. The media content manager component may be operative to generate a visual composition for a multimedia conference event for rendering on the display. The media content manager component may comprise, among other elements, a video decoder module operative to decode multiple media streams for a multimedia conference event. The media content manager component may comprise a media stream manager module communicatively coupled to the video decoder module, the media stream manager module operative to determine a total number of decoded media streams is greater than a total number of available display frames in a visual composition. The media content manager component may comprise a media selection module communicatively coupled to the media stream manager module, the media selection module operative to select an active group of decoded media streams from among the total number of decoded media streams for mapping to the available display frames based on speech activity. Other embodiments are described and claimed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments may be generally directed to multimedia conference systems arranged to provide meeting and collaboration services to multiple participants over a network. Some multimedia conference systems may be designed to operate with various packet-based networks, such as the Internet or World Wide Web ("web"), to provide web-based conferencing services. Such implementations are sometimes referred to as web conferencing systems. An example of a web conferencing system may include MICROSOFT® OFFICE LIVE MEETING made by Microsoft Corporation, Redmond, Wash. Other multimedia conference systems may be designed to operate for a private network, business, organization, or enterprise, and may utilize a multimedia conference server such as MICROSOFT OFFICE COMMUNICATIONS SERVER made by Microsoft Corporation, Redmond, Wash. It may be appreciated, however, that implementations are not limited to these examples.

A multimedia conference system may include, among other network elements, a multimedia conference server or other processing device arranged to provide web conferencing services. For example, a multimedia conference server may include, among other server elements, a server meeting component operative to control and mix different types of media content for a meeting and collaboration event, such as a web conference. A meeting and collaboration event may refer to any multimedia conference event offering various types of multimedia information in a real-time or live online environment, and is sometimes referred to herein as simply a "meeting event," "multimedia event" or "multimedia conference event."

In one embodiment, the multimedia conference system may further include one or more computing devices implemented as meeting consoles. Each meeting console may be arranged to participate in a multimedia event by connecting to the multimedia conference server. Different types of media information from the various meeting consoles may be received by the multimedia conference server during the multimedia event, which in turn distributes the media information to some or all of the other meeting consoles participating in the multimedia event As such, any given meeting console may have a display with multiple media content views of different types of media content. In this manner various geographically disparate participants may interact and communicate information in a virtual meeting environment similar to a physical meeting environment where all the participants are within one room.

Participants in a multimedia conference event are typically listed in a GUI view with a participant roster. The participant roster may have some identifying information for each participant, including a name, location, image, title, and so forth. The participants and identifying information for the participant roster is typically derived from a meeting console used to join the multimedia conference event. For example, a participant typically uses a meeting console to join a virtual meeting room for a multimedia conference event. Prior to joining, the participant provides various types of identifying information to perform authentication operations with the multimedia conference server. Once the multimedia conference server authenticates the participant, the participant is allowed access to the virtual meeting room, and the multimedia conference server adds the identifying information to the participant roster.

In a virtual meeting environment, however, it may be difficult to display all of the various participants of a meeting. For example, the display may not have sufficient display area to render GUI views for all of the meeting participants. This may be due to technical constraints on communications or computing resources at the meeting console, the multimedia conference server, or both. This may also be caused by having a display with insufficient display area to render GUI views for all the participants in a manner that is easily discernible by the viewer. For example, electronic devices with smaller form factors, such as a handheld computer or cellular telephone, may have smaller display areas that are physically or logically incapable of rendering the needed GUI views. For those electronic devices with larger displays, such as notebook or table computers, the number of meeting participants may necessitate GUI views of such a small size that the individual meeting participants are difficult to view. Even for those electronic devices capable of using displays without practical display area constraints, such as desktop computers with full-size monitors, the number of meeting participants may lead to a corresponding number of GUI views that when simultaneously displayed creates a confusing and crowded visual composition. This problem is further exacerbated since a meeting participant acting in the role of a conference leader may "pin" certain GUI views for certain meeting participants. When this occurs, the meeting consoles all display the pinned GUI views regardless of the speech activity of the meeting participants rendered by the GUI views. Consequently, the number of available GUI views is further reduced to the extent that some of the GUI views are pinned by the conference leader.

To solve these and other problems, the embodiments are generally directed to techniques to generate a visual composition for a multimedia conference event. More particularly, certain embodiments are directed to techniques to generate a visual composition that provides a more natural representation for meeting participants in the digital domain. The visual composition integrates and aggregates different types of multimedia content related to each participant in a multimedia conference event, including video content, audio content, identifying information, and so forth. The visual composition presents the integrated and aggregated information in a manner that allows the effective display of a number of GUI views that are less than a number of meeting participants.

In various embodiments, a media content manager component may selectively display GUI views having meeting participants that are actively speaking or likely to speak at any given moment in time. When a meeting participant that is not currently being displayed engages in speech activity, the media content manager component may selectively replace an existing meeting participant currently displayed by a given GUI view with the new meeting participant. This may be accomplished, for example, by utilizing a selection algorithm tuned to replace an existing meeting participant in an intelligent manner according to a set of media content selection rules. In this manner, the media content manager component potentially provides several advantages over conventional display techniques, such as reducing the number of repetitions in media content, limiting transitions between media content displayed by a given GUI view, and providing a viewer some flexibility in choosing a particular set of media content displayed at any given time. As a result, the improved display techniques in a virtual meeting environment may enhance user experience and convenience.

Figure 1:
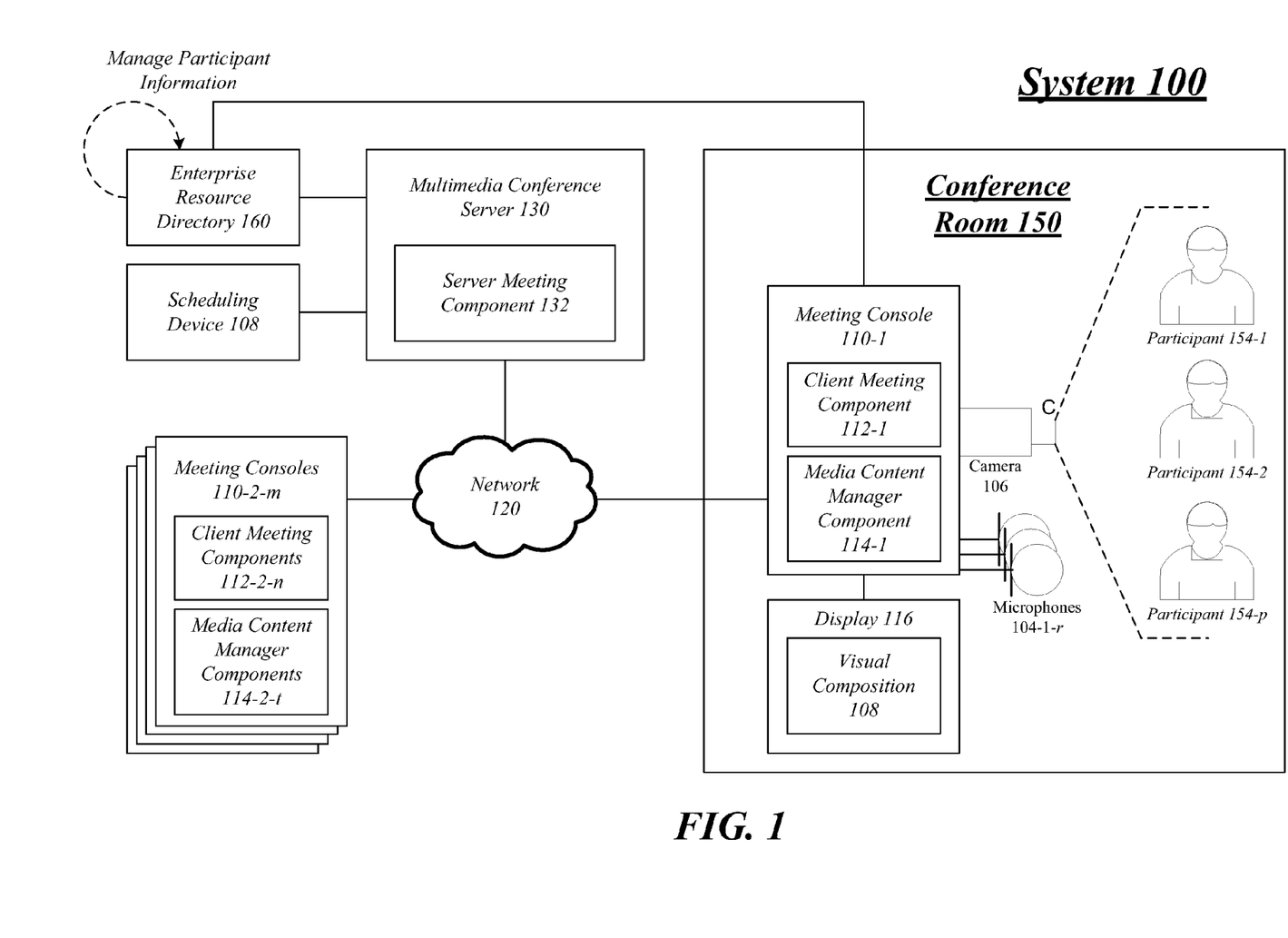
FIG. 1 illustrates an embodiment of a multimedia conference system.

FIG. 1 illustrates a block diagram for a multimedia conference system 100. Multimedia conference system 100 may represent a general system architecture suitable for implementing various embodiments. Multimedia conference system 100 may comprise multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although multimedia conference system 100 as shown in FIG. 1 has a limited number of elements in a certain topology, it may be appreciated that multimedia conference system 100 may include more or less elements in alternate topologies as desired for a given implementation. The embodiments are not limited in this context.

In various embodiments, the multimedia conference system 100 may comprise, or form part of, a wired communications system, a wireless communications system, or a combination of both. For example, the multimedia conference system 100 may include one or more elements arranged to communicate information over one or more types of wired communications links. Examples of a wired communications link may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The multimedia conference system 100 also may include one or more elements arranged to communicate information over one or more types of wireless communications links. Examples of a wireless communications link may include, without limitation, a radio channel, infrared channel, radio-frequency (RF) channel, Wireless Fidelity (WiFi) channel, a portion of the RF spectrum, and/or one or more licensed or license-free frequency bands.

In various embodiments, the multimedia conference system 100 may be arranged to communicate, manage or process different types of information, such as media information and control information. Examples of media information may generally include any data representing content meant for a user, such as voice information, video information, audio information, image information, textual information, numerical information, application information, alphanumeric symbols, graphics, and so forth. Media information may sometimes be referred to as "media content" as well. Control information may refer to any data representing commands, instructions or control words meant for an automated system. For example, control information may be used to route media information through a system, to establish a connection between devices, instruct a device to process the media information in a predetermined manner, and so forth.

In various embodiments, multimedia conference system 100 may include a multimedia conference server 130. The multimedia conference server 130 may comprise any logical or physical entity that is arranged to establish, manage or control a multimedia conference call between meeting consoles 110-1-m over a network 120. Network 120 may comprise, for example, a packet-switched network, a circuit-switched network, or a combination of both. In various embodiments, the multimedia conference server 130 may comprise or be implemented as any processing or computing device, such as a computer, a server, a server array or server farm, a work station, a mini-computer, a main frame computer, a supercomputer, and so forth. The multimedia conference server 130 may comprise or implement a general or specific computing architecture suitable for communicating and processing multimedia information. In one embodiment, for example, the multimedia conference server 130 may be implemented using a computing architecture as described with reference to FIG. 5. Examples for the multimedia conference server 130 may include without limitation a MICROSOFT OFFICE COMMUNICATIONS SERVER, a MICROSOFT OFFICE LIVE MEETING server, and so forth.

A specific implementation for the multimedia conference server 130 may vary depending upon a set of communication protocols or standards to be used for the multimedia conference server 130. In one example, the multimedia conference server 130 may be implemented in accordance with the Internet Engineering Task Force (IETF) Multiparty Multimedia Session Control (MMUSIC) Working Group Session Initiation Protocol (SIP) series of standards and/or variants. SIP is a proposed standard for initiating, modifying, and terminating an interactive user session that involves multimedia elements such as video, voice, instant messaging, online games, and virtual reality. In another example, the multimedia conference server 130 may be implemented in accordance with the International Telecommunication Union (ITU) H.323 series of standards and/or variants. The H.323 standard defines a multipoint control unit (MCU) to coordinate conference call operations. In particular, the MCU includes a multipoint controller (MC) that handles H.245 signaling, and one or more multipoint processors (MP) to mix and process the data streams. Both the SIP and H.323 standards are essentially signaling protocols for Voice over Internet Protocol (VoIP) or Voice Over Packet (VOP) multimedia conference call operations. It may be appreciated that other signaling protocols may be implemented for the multimedia conference server 130, however, and still fall within the scope of the embodiments.

In general operation, multimedia conference system 100 may be used for multimedia conference calls. Multimedia conference calls typically involve communicating voice, video, and/or data information between multiple end points. For example, a public or private packet network 120 may be used for audio conferencing calls, video conferencing calls, audio/video conferencing calls, collaborative document sharing and editing, and so forth. The packet network 120 may also be connected to a Public Switched Telephone Network (PSTN) via one or more suitable VoIP gateways arranged to convert between circuit-switched information and packet information.

To establish a multimedia conference call over the packet network 120, each meeting console 110-1-m may connect to multimedia conference server 130 via the packet network 120 using various types of wired or wireless communications links operating at varying connection speeds or bandwidths, such as a lower bandwidth PSTN telephone connection, a medium bandwidth DSL modem connection or cable modem connection, and a higher bandwidth intranet connection over a local area network (LAN), for example.

In various embodiments, the multimedia conference server 130 may establish, manage and control a multimedia conference call between meeting consoles 110-1-m. In some embodiments, the multimedia conference call may comprise a live web-based conference call using a web conferencing application that provides full collaboration capabilities. The multimedia conference server 130 operates as a central server that controls and distributes media information in the conference. It receives media information from various meeting consoles 110-1-m, performs mixing operations for the multiple types of media information, and forwards the media information to some or all of the other participants. One or more of the meeting consoles 110-1-m may join a conference by connecting to the multimedia conference server 130. The multimedia conference server 130 may implement various admission control techniques to authenticate and add meeting consoles 110-1-m in a secure and controlled manner.

In various embodiments, the multimedia conference system 100 may include one or more computing devices implemented as meeting consoles 110-1-m to connect to the multimedia conference server 130 over one or more communications connections via the network 120. For example, a computing device may implement a client application that may host multiple meeting consoles each representing a separate conference at the same time. Similarly, the client application may receive multiple audio, video and data streams. For example, video streams from all or a subset of the participants may be displayed as a mosaic on the participant's display with a top window with video for the current active speaker, and a panoramic view of the other participants in other windows.

The meeting consoles 110-1-$m$ may comprise any logical or physical entity that is arranged to participate or engage in a multimedia conference call managed by the multimedia conference server 130. The meeting consoles 110-1-$m$ may be implemented as any device that includes, in its most basic form, a processing system including a processor and memory, one or more multimedia input/output (I/O) components, and a wireless and/or wired network connection. Examples of multimedia I/O components may include audio I/O components (e.g., microphones, speakers), video I/O components (e.g., video camera, display), tactile (I/O) components (e.g., vibrators), user data (I/O) components (e.g., keyboard, thumb board, keypad, touch screen), and so forth. Examples of the meeting consoles 110-1-$m$ may include a telephone, a VoIP or VOP telephone, a packet telephone designed to operate on the PSTN, an Internet telephone, a video telephone, a cellular telephone, a personal digital assistant (PDA), a combination cellular telephone and PDA, a mobile computing device, a smart phone, a one-way pager, a two-way pager, a messaging device, a computer, a personal computer (PC), a desktop computer, a laptop computer, a notebook computer, a handheld computer, a network appliance, and so forth. In some implementations, the meeting consoles 110-1-$m$ may be implemented using a general or specific computing architecture similar to the computing architecture described with reference to FIG. 5.

The meeting consoles 110-1-$m$ may comprise or implement respective client meeting components 112-1-$n$. The client meeting components 112-1-$n$ may be designed to interoperate with the server meeting component 132 of the multimedia conference server 130 to establish, manage or control a multimedia conference event. For example, the client meeting components 112-1-$n$ may comprise or implement the appropriate application programs and user interface controls to allow the respective meeting consoles 110-1-$m$ to participate in a web conference facilitated by the multimedia conference server 130. This may include input equipment (e.g., video camera, microphone, keyboard, mouse, controller, etc.) to capture media information provided by the operator of a meeting console 110-1-$m$, and output equipment (e.g., display, speaker, etc.) to reproduce media information by the operators of other meeting consoles 110-1-$m$. Examples for client meeting components 112-1-$n$ may include without limitation a MICROSOFT OFFICE COMMUNICATOR or the MICROSOFT OFFICE LIVE MEETING Windows Based Meeting Console, and so forth.

As shown in the illustrated embodiment of FIG. 1, the multimedia conference system 100 may include a conference room 150. An enterprise or business typically utilizes conference rooms to hold meetings. Such meetings include multimedia conference events having participants located internal to the conference room 150, and remote participants located external to the conference room 150. The conference room 150 may have various computing and communications resources available to support multimedia conference events, and provide multimedia information between one or more remote meeting consoles 110-2-$m$ and the local meeting console 110-1. For example, the conference room 150 may include a local meeting console 110-1 located internal to the conference room 150.

The local meeting console 110-1 may be connected to various multimedia input devices and/or multimedia output devices capable of capturing, communicating or reproducing multimedia information. The multimedia input devices may comprise any logical or physical device arranged to capture or receive as input multimedia information from operators within the conference room 150, including audio input devices, video input devices, image input devices, text input devices, and other multimedia input equipment. Examples of multimedia input devices may include without limitation video cameras, microphones, microphone arrays, conference telephones, whiteboards, interactive whiteboards, voice-to-text components, text-to-voice components, voice recognition systems, pointing devices, keyboards, touchscreens, tablet computers, handwriting recognition devices, and so forth. An example of a video camera may include a ringcam, such as the MICROSOFT ROUNDTABLE made by Microsoft Corporation, Redmond, Wash. The MICROSOFT ROUNDTABLE is a videoconferencing device with a 360 degree camera that provides remote meeting participants a panoramic video of everyone sitting around a conference table. The multimedia output devices may comprise any logical or physical device arranged to reproduce or display as output multimedia information from operators of the remote meeting consoles 110-2-$m$, including audio output devices, video output devices, image output devices, text input devices, and other multimedia output equipment. Examples of multimedia output devices may include without limitation electronic displays, video projectors, speakers, vibrating units, printers, facsimile machines, and so forth.

The local meeting console 110-1 in the conference room 150 may include various multimedia input devices arranged to capture media content from the conference room 150 including the participants 154-1-$p$, and stream the media content to the multimedia conference server 130. In the illustrated embodiment shown in FIG. 1, the local meeting console 110-1 includes a video camera 106 and an array of microphones 104-1-$r$. The video camera 106 may capture video content including video content of the participants 154-1-$p$ present in the conference room 150, and stream the video content to the multimedia conference server 130 via the local meeting console 110-1. Similarly, the array of microphones 104-1-$r$ may capture audio content including audio content from the participants 154-1-$p$ present in the conference room 150, and stream the audio content to the multimedia conference server 130 via the local meeting console 110-1. The local meeting console may also include various media output devices, such as a display 116 or video projector, to show one or more GUI views with video content or audio content from all the participants using the meeting consoles 110-1-$m$ received via the multimedia conference server 130.

The meeting consoles 110-1-$m$ and the multimedia conference server 130 may communicate media information and control information utilizing various media connections established for a given multimedia conference event. The media connections may be established using various VoIP signaling protocols, such as the SIP series of protocols. The SIP series of protocols are application-layer control (signaling) protocol for creating, modifying and terminating sessions with one or more participants. These sessions include Internet multimedia conferences, Internet telephone calls and multimedia distribution. Members in a session can communicate via multicast or via a mesh of unicast relations, or a combination of these. SIP is designed as part of the overall IETF multimedia data and control architecture currently incorporating protocols such as the resource reservation protocol (RSVP) (IEEE RFC 2205) for reserving network resources, the real-time transport protocol (RTP) (IEEE RFC 1889) for transporting real-time data and providing Qualityof-Service (QOS) feedback, the real-time streaming protocol (RTSP) (IEEE RFC 2326) for controlling delivery of streaming media, the session announcement protocol (SAP) for advertising multimedia sessions via multicast, the session description protocol (SDP) (IEEE RFC 2327) for describing multimedia sessions, and others. For example, the meeting consoles 110-1-$m$ may use SIP as a signaling channel to setup the media connections, and RTP as a media channel to transport media information over the media connections.

In general operation, a schedule device 108 may be used to generate a multimedia conference event reservation for the multimedia conference system 100. The scheduling device 108 may comprise, for example, a computing device having the appropriate hardware and software for scheduling multimedia conference events. For example, the scheduling device 108 may comprise a computer utilizing MICROSOFT OFFICE OUTLOOK® application software, made by Microsoft Corporation, Redmond, Wash. The MICROSOFT OFFICE OUTLOOK application software comprises messaging and collaboration client software that may be used to schedule a multimedia conference event. An operator may use MICROSOFT OFFICE OUTLOOK to convert a schedule request to a MICROSOFT OFFICE LIVE MEETING event that is sent to a list of meeting invitees. The schedule request may include a hyperlink to a virtual room for a multimedia conference event. An invitee may click on the hyperlink, and the meeting console 110-1-$m$ launches a web browser, connects to the multimedia conference server 130, and joins the virtual room. Once there, the participants can present a slide presentation, annotate documents or brainstorm on the built in whiteboard, among other tools.

An operator may use the scheduling device 108 to generate a multimedia conference event reservation for a multimedia conference event. The multimedia conference event reservation may include a list of meeting invitees for the multimedia conference event. The meeting invitee list may comprise a list of individuals invited to a multimedia conference event. In some cases, the meeting invitee list may only include those individuals invited and accepted for the multimedia event. A client application, such as a mail client for Microsoft Outlook, forwards the reservation request to the multimedia conference server 130. The multimedia conference server 130 may receive the multimedia conference event reservation, and retrieve the list of meeting invitees and associated information for the meeting invitees from a network device, such as an enterprise resource directory 160.

The enterprise resource directory 160 may comprise a network device that publishes a public directory of operators and/or network resources. A common example of network resources published by the enterprise resource directory 160 includes network printers. In one embodiment, for example, the enterprise resource directory 160 may be implemented as a MICROSOFT ACTIVE DIRECTORY®. Active Directory is an implementation of lightweight directory access protocol (LDAP) directory services to provide central authentication and authorization services for network computers. Active Directory also allows administrators to assign policies, deploy software, and apply critical updates to an organization. Active Directory stores information and settings in a central database. Active Directory networks can vary from a small installation with a few hundred objects, to a large installation with millions of objects.

In various embodiments, the enterprise resource directory 160 may include identifying information for the various meeting invitees to a multimedia conference event. The identifying information may include any type of information capable of uniquely identifying each of the meeting invitees. For example, the identifying information may include without limitation a name, a location, contact information, account numbers, professional information, organizational information (e.g., a title), personal information, connection information, presence information, a network address, a media access control (MAC) address, an Internet Protocol (IP) address, a telephone number, an email address, a protocol address (e.g., SIP address), equipment identifiers, hardware configurations, software configurations, wired interfaces, wireless interfaces, supported protocols, and other desired information.

The multimedia conference server 130 may receive the multimedia conference event reservation, including the list of meeting invitees, and retrieves the corresponding identifying information from the enterprise resource directory 160. The multimedia conference server 130 may use the list of meeting invitees and corresponding identifying information to assist in identifying the participants to a multimedia conference event. For example, the multimedia conference server 130 may forward the list of meeting invitees and accompanying identifying information to the meeting consoles 110-1-$m$ for use in identifying the participants in a visual composition 108 for the multimedia conference event.

Referring again to the meeting consoles 110-1-$m$, each of the meeting controls 110-1-$m$ may comprise or implement respective media content manager components 114-1-$t$. The media content manager components 114-1-$t$ may generally operate to generate, manage and display a visual composition 108 for a multimedia conference event on a display 116. Although the visual composition 108 and display 116 are shown as part of the meeting console 110-1 by way of example and not limitation, it may be appreciated that each of the meeting consoles 110-1-$m$ may include an electronic display similar to the display 116 and capable of rendering the visual composition 108 for each operator of the meeting consoles 110-1-$m$.

In one embodiment, for example, the local meeting console 110-1 may comprise the display 116 and the media content manager component 114-1 operative to generate a visual composition 108 for a multimedia conference event. The media content manager component 114-1 may comprise various hardware elements and/or software elements arranged to generate the visual composition 108 that provides a more natural representation for meeting participants (e.g., 154-1-$p$) in the digital domain. The visual composition 108 integrates and aggregates different types of multimedia content related to each participant in a multimedia conference event, including video content, audio content, identifying information, and so forth.

A media content manager component 114-1-$t$ may selectively display various GUI views for the visual composition 108. The visual composition 108 may include multiple GUI views, with each GUI view having one or more meeting participants. When a meeting participant that is not currently being displayed in a GUI view for the visual composition 108 engages in speech activity, the media content manager component 114-1-$t$ may selectively replace an existing meeting participant that is currently being displayed by a given GUI view with the new meeting participant. This may be accomplished, for example, utilizing a selection algorithm tuned to replace an existing meeting participant in an intelligent manner according to a set of media content selection rules. The meeting consoles 110-1-$m$ in general, and the media content manager component 114-1-$t$ in particular, may be described in more detail with reference to FIG. 2.

Figure 2:
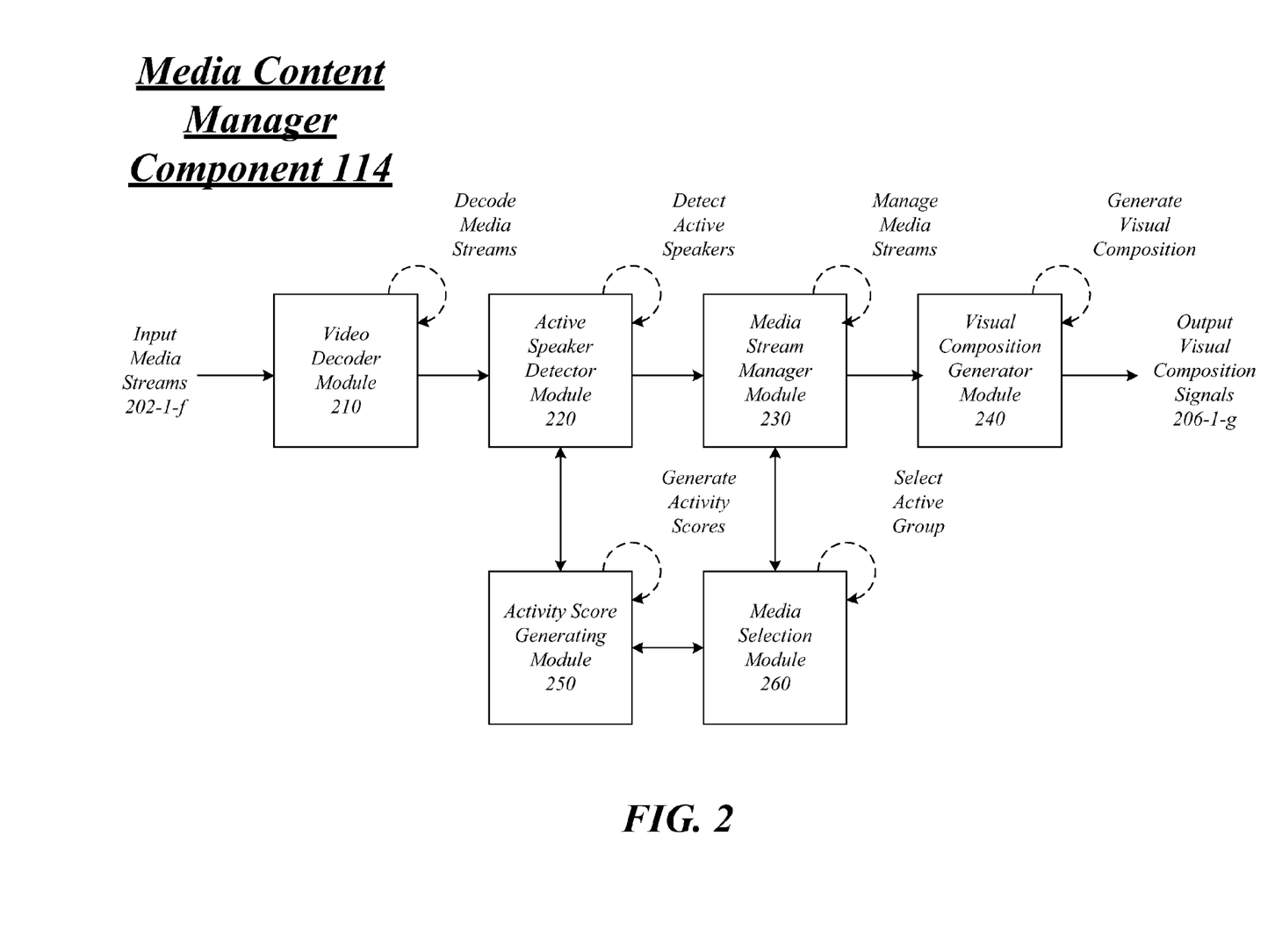
FIG. 2 illustrates an embodiment of a media content manager component.

FIG. 2 illustrates a block diagram for an exemplary media content manager component 114 from the media content manager components 114-1-*t*. The media content manager component 114 may comprise multiple modules. The modules may be implemented using hardware elements, software elements, or a combination of hardware elements and software elements. Although the media content manager component 114 as shown in FIG. 2 has a limited number of elements in a certain topology, it may be appreciated that the media content manager component 114 may include more or less elements in alternate topologies as desired for a given implementation. The embodiments are not limited in this context.

In the illustrated embodiment shown in FIG. 2, the media content manager component 114 includes a video decoder module 210. The video decoder module 210 may generally decode media streams received from various meeting consoles 110-1-*m* via the multimedia conference server 130. In one embodiment, for example, the video decoder module 210 may be arranged to receive input media streams 202-1-*f* from various meeting consoles 110-1-*m* participating in a multimedia conference event. The video decoder module 210 may decode the input media streams 202-1-*f* into digital or analog video content suitable for display by the display 116. Further, the video decoder module 210 may decode the input media streams 202-1-*f* into various spatial resolutions and temporal resolutions suitable for the display 116 and the display frames used by the visual composition 108.

The media content manager component 114-1 may comprise an active speaker detector module (ASD) module 220 communicatively coupled to the video decoder module 210. The ASD module 220 may generally detect whether any participants in the decoded media streams 202-1-*f* are active speakers or otherwise engaged in detectible speech activity. Various active speaker detection techniques may be implemented for the ASD module 220. In one embodiment, for example, the ASD module 220 may detect and measure voice energy in a decoded media stream, rank the measurements according to highest voice energy to lowest voice energy, and select the decoded media stream with the highest voice energy as representing the current active speaker. Other ASD techniques may be used, however, and the embodiments are not limited in this context.

In some cases, however, it may be possible for an input media stream 202-1-*f* to contain more than one participant, such as the input media stream 202-1 from the local meeting console 110-1 located in the conference room 150. In this case, the ASD module 220 may be arranged to detect dominant or active speakers from among the participants 154-1-*p* located in the conference room 150 using audio (sound source localization) and video (motion and spatial patterns) features. The ASD module 220 may determine the dominant speaker in the conference room 150 when several people are talking at the same time. It also compensates for background noises and hard surfaces that reflect sound. For example, the ASD module 220 may receive inputs from six separate microphones 104-1-*r* to differentiate between different sounds and isolate the dominant one through a process called beamforming. Each of the microphones 104-1-*r* is built into a different part of the meeting console 110-1. Despite the speed of sound, the microphones 104-1-*r* may receive voice information from the participants 154-1-*p* at different time intervals relative to each other. The ASD module 220 may use this time difference to identify a source for the voice information. Once the source for the voice information is identified, a controller for the local meeting console 110-1 may use visual cues from the video camera 106-1-*p* to pinpoint, enlarge and emphasize the face of the dominant speaker. In this manner, the ASD module 220 of the local meeting console 110-1 isolates a single participant 154-1-*p* from the conference room 150 as the active speaker on the transmit side.

The media content manager component 114-1 may comprise a media stream manager (MSM) module 230 communicatively coupled to the ASD module 220. The MSM module 230 may generally map decoded media streams to various display frames. In one embodiment, for example, the MSM module 230 may be arranged to determine a total number of decoded input media streams 202-1-*f*. This information may be received, for example, from the video decoder module 210. The MSM module 230 may also determine a total number of available display frames in the visual composition 108. The total number of available display frames may be calculated based on technical constraints (e.g., computing resources or communications resources), viewing constraints (e.g., display area or desired GUI view size), or other design constraints. The MSM module 230 may compare the total numbers to determine whether the total number of decoded media streams is greater than the total number of available display frames in the visual composition 108, thereby necessitating implementation of a media content selection algorithm to select which of the decoded media streams will be displayed using the available display frames. The media content selection algorithm may be implemented by a media selection module 260.

By way of example, assume that L represents a number of decoded media streams decoded by the video decoder module 210, and A represents a number of available display frames for the visual composition 108. Further assume that A=x+y, where x represents a number of display frames used to render pinned decoded media streams, and y represents a number display frames used to render decoded media streams in the active group of decoded media streams.

When the total number of decoded media streams is not greater than the total number of display frames in the visual composition 108 (e.g., L<=A), the MSM module 230 may map the decoded media streams to the available display frames. In this case, the video composition 108 may have a sufficient number of available display frames to display all of the participants 154-1-*p* in the decoded media streams for a given multimedia conference event.

When the total number of decoded media streams is greater than the total number of display frames in the visual composition 108 (e.g., L>A), however, the MSM module 230 may need to map a subset of the total number of decoded media streams to the available display frames. In this case, the video composition 108 may not necessarily have a sufficient number of available display frames to display all of the participants 154-1-*p* in the decoded media streams for a given multimedia conference event. The particular subset of decoded media streams to be rendered by the available display frames may be selected by the media selection module 260.

The media selection module 260 may be arranged to select an active group of decoded media streams from among the total number of decoded media streams for mapping to the available display frames based on speech activity. The active group of decoded media streams may refer to those decoded media streams currently mapped to an available display frame. By way of contrast, those decoded media streams that are not currently mapped to an available display frame are referred to as a non-active group of decoded media streams. The members of the non-active group are typically not viewable via video content from a decoded media stream, but may be audibly heard via audio content from the decoded media stream.

During initialization or at the start of a media conferencing event, the media selection module 260 may initially select the active group of decoded media streams in any number of different ways. For example, the media selection module 260 may select the active group in a random or arbitrary manner. In another example, the media selection module 260 may select the active group in accordance with a set of selection rules, such as in order of when the participants 154-1-$p$ join the multimedia conference event. In some cases, the media selection module 260 may select the active group based on some set of heuristics designed to predict those participants 154-1-$p$ that are more likely to engage in speech activity than not. For example, certain participants 154-1-$p$ may be designated as presenters for a multimedia conference event, while other participants 154-1-$p$ may be designated as attendees for the multimedia conference event. Since presenters typically speak more during a multimedia conference event than attendees, those participants 154-1-$p$ designated as presenters may be initially selected as the active group. In any event, the media selection module 260 may initially select the active group, and send the active group selection to the MSM module 230 for mapping to an available display frame.

At some point during a multimedia conference event, the MSM module 230 may have to periodically re-configure the active group to display different participants 154-1-$p$ than those initially selected by the media selection module 260. In one embodiment, for example, the media selection module 260 may select a member of a non-active group of decoded media streams as a non-active replacement candidate to replace a member of the active group of decoded media streams based on speech activity. During the course of a multimedia conference event, it is likely that a participant 154-1-$p$ in the non-active group of decoded media streams may engage in speech activity, such as an attendee asking a question for a presenter. The ASD module 220 monitors the decoded media streams to detect when speech activity occurs. When the ASD module 220 detects a member of a non-active group engaging in speech activity, the ASD module 220 may send notification to the MSM module 230.

The MSM module 230 may potentially re-configure the active group based on speech activity detected by the ASD module 220. When the MSM module 230 has an available display frame not currently mapped to a decoded media stream for the active group, the MSM module 230 maps the member of the non-active group to the available display frame. When there are no available display frames, however, the MSM module 230 may send a control directive to the media selection module 260 to select a member of the active group for replacement by the speaking member of the non-active group.

The media selection module 260 may be arranged to select a member of the active group of decoded media streams as an active replacement candidate to be replaced by a member of the non-active group of decoded media streams based on an activity score. The active replacement candidate could be a participant 154-1-$p$ that will reduce the probability of being swapped back into the active group by engaging in subsequent speech activity in temporal proximity to being placed in the non-active group. In other words, the active replacement candidate should ideally be a member of the active group that is least likely to speak again shortly after being placed in the non-active group, thereby forcing another short-term swap into the active group.

In some cases, the active replacement candidate may be selected using an activity score. The media content manager component 114 may comprise an activity score generating (ASG) module 250 communicatively coupled to the ASD module 220 and the media selection module 260. The ASG module 250 may receive speech activity information from the ASD module 220. The ASG module 250 may use the speech activity information, among other inputs, to generate activity scores for the participants 154-1-$p$. The activity scores may represent different levels of speech activity for each of the participants 154-1-$p$. The activity scores may then be output to the media selection module 260 for use in selecting the active group.

In one embodiment, for example, the ASG module 250 may generate an activity score to represent characteristics of speech activity for participants 154-1-$p$ of the decoded media streams. The ASG module 250 may implement various scoring algorithms that generate activity scores based on different characteristics of speech activity that are somewhat predictive of when a member of the active group will speak again. Varying metrics may be defined for the different characteristics, and used to generate statistics or analytics that can be used as predictors of future speech activity. The media selection module 260 may use the activity scores to select an active replacement candidate from the active group that has a lower probability of speaking in the short term, thereby reducing transitions of members between the active group and non-active group. In general, a higher activity score indicates a higher level of speech activity, while a lower activity score indicates a lower level of speech activity, although the embodiments are not limited to this example. The activity scores may be ranked and/or rated for relevance thereby facilitating the selection operations.

In one embodiment, for example, the ASG module 250 may generate an activity score to represent a most recent time for speech activity by a participant 154-1-$p$. The ASD module 220 may monitor the decoded media streams and record when speech activity for a given decoded media stream occurs. A time stamp may be stored for each participant 154-1-$p$ of the decoded media streams. The time stamp may have a date and/or time representing the most recent time a participant 154-1-$p$ engaged in speech activity, such as asking a question or presenting information. The ASG module 250 may analyze the time stamps for all of the participants 154-1-$p$, and generate a higher activity score for those time stamps that are more recent in time thereby illustrating recent speech activity, and a lower activity score for those time stamps that are older thereby illustrating older speech activity. The higher activity score may be predictive that a participant 154-1-$p$ that recently spoke is more likely engaged in the subject matter of the multimedia conference event, and therefore has a higher likelihood of speaking again in the near future. The lower activity score may be predictive that the participant 154-1-$p$ that spoke earlier in the multimedia conference event is less likely engaged in the current subject matter of the multimedia conference event, and therefore has a lower likelihood of speaking again in the near future, thereby making a good candidate for replacement in the active group.

In one embodiment, for example, the ASG module 250 may generate an activity score to represent a ratio value of speech activity to non-speech activity. The ASD module 220 may monitor the decoded media streams and record when speech activity for a given decoded media stream occurs. Multiple time stamps may be stored for each participant 154-1-$p$ of the decoded media streams. The time stamps may have a date and/or time representing each time a participant 154-1-$p$ engaged in speech activity, and an amount of time for which the speech activity occurred. The ASG module 250 may analyze the time stamps for all of the participants 154-1-$p$ to determine a ratio value of speech activity to non-speech activity. The ASG module 250 may generate a higher activity score for those ratio values that indicate a greater amount of speech activity relative to non-speech activity, and a lower activity score for those ratio values that indicate a lesser amount of speech activity relative to non-speech activity. The higher activity score may be predictive that a participant 154-1-$p$ that speaks more frequently and/or for longer time periods has a higher likelihood of speaking again in the near future. The lower activity score may be predictive that the participant 154-1-$p$ that speaks less frequently and/or for short time periods has a lower likelihood of speaking again in the near future, thereby making a good candidate for replacement in the active group.

In one embodiment, for example, the ASG module 250 may generate an activity score to represent a count value for speech activity by a participant. Rather than using a ratio value to represent speech duration and/or frequency as with the previous example, the ASG module 250 may implement a counter for each participant 154-1-$p$ and count each time the participant 154-1-$p$ engages in speech activity. Similar to the ratio value, a higher activity score may be assigned to higher counts, and a lower activity score may be assigned to lower counts. The higher activity score may be predictive that a participant 154-1-$p$ that speaks more frequently has a higher likelihood of speaking again in the near future. The lower activity score may be predictive that the participant 154-1-$p$ that speaks less frequently has a lower likelihood of speaking again in the near future, thereby making a good candidate for replacement in the active group.

In one embodiment, for example, the ASG module 250 may generate an activity score to represent a length value for speech activity by a participant. The ASD module 220 may monitor the decoded media streams and record when speech activity for a given decoded media stream occurs. Multiple time stamps may be stored for each participant 154-1-$p$ of the decoded media streams. The time stamps may have a date and/or time representing each time a participant 154-1-$p$ engaged in speech activity, and an amount of time for which the speech activity occurred. The ASG module 250 may analyze the time stamps for all of the participants 154-1-$p$ to determine an average length of speech activity for each participant 154-1-$p$. The ASG module 250 may generate a higher activity score for those average length values that indicate a longer duration of speech activity, and a lower activity score for those average length values that indicate a shorter duration of speech activity. The higher activity score may be predictive that a participant 154-1-$p$ that speaks for longer time periods has a higher likelihood of speaking again in the near future. The lower activity score may be predictive that the participant 154-1-$p$ that speaks for short time periods has a lower likelihood of speaking again in the near future, thereby making a good candidate for replacement in the active group.

Once the ASG module 250 generates the activity scores for the participants 154-1-$p$, the ASG module 250 may output the activity scores to the media selection module 260. The media selection module 260 may use the activity scores to select the active replacement candidate, and output the active replacement candidate to the MSM 230. The MSM module 230 may then replace the active replacement candidate from the active group with the non-active replacement candidate from a non-active group. For example, the MSM module 230 may de-allocate the active replacement candidate from the available display frame, and map the non-active replacement candidate to the newly released available display frame. In this manner, the available display frames may be used to display the more active speakers while reducing transitions between media content displayed by the available display frames.

The media content manager component 114-1 may comprise a visual composition generator (VCG) module 240 communicatively coupled to the MSM module 230. The VCG module 240 may generally render or generate the visual composition 108. In one embodiment, for example, the VCG module 240 may be arranged to generate the visual composition 108 with a participant roster having the available display frames positioned in static or dynamic manner. The VCG module 240 may output visual composition signals 206-1-$g$ to the display 116 via a video graphics controller and/or GUI module of an operating system for a given meeting console 110-1-$m$.

Figure 3A:
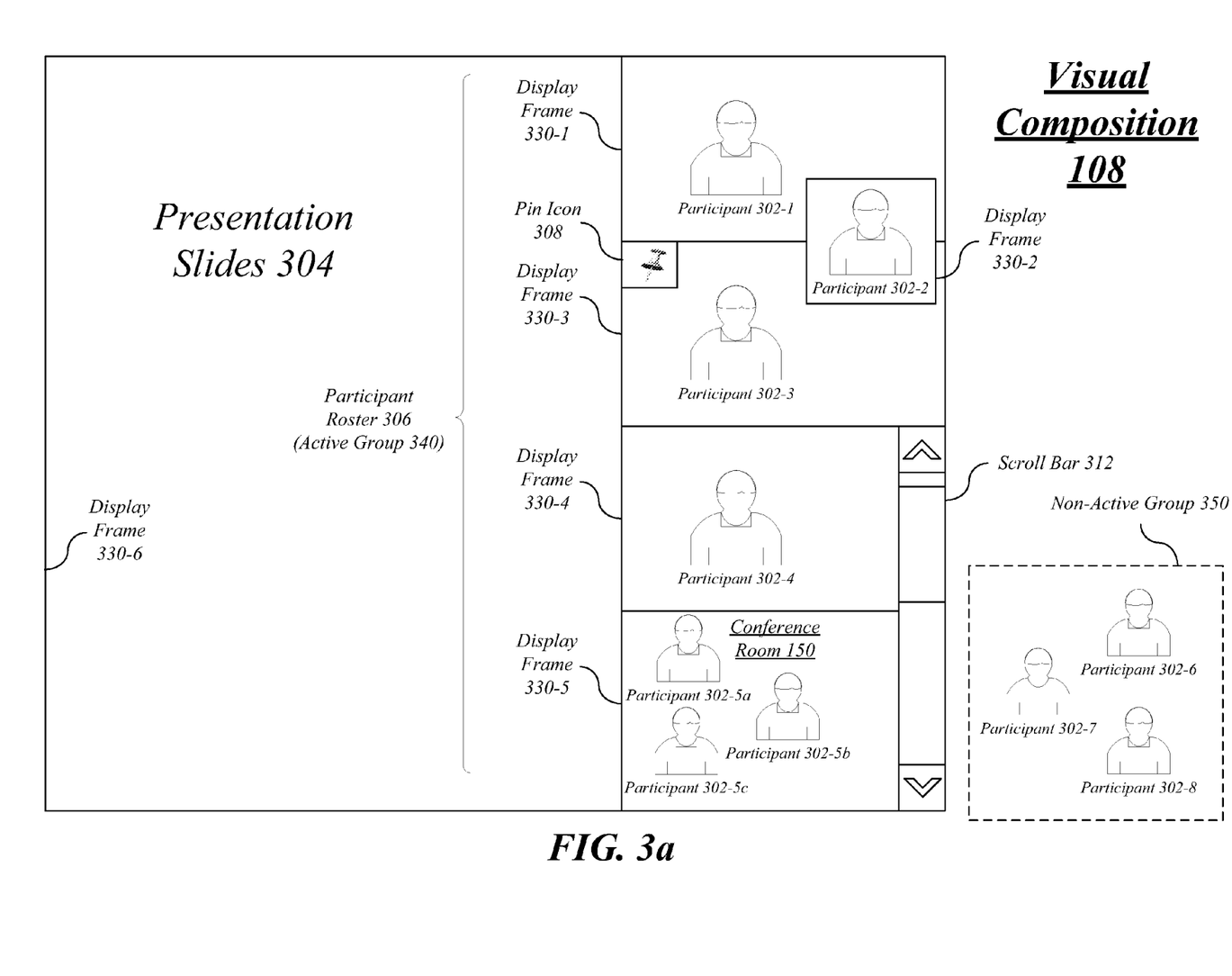
FIG. 3a illustrates an embodiment of a first visual composition.
Figure 3B:
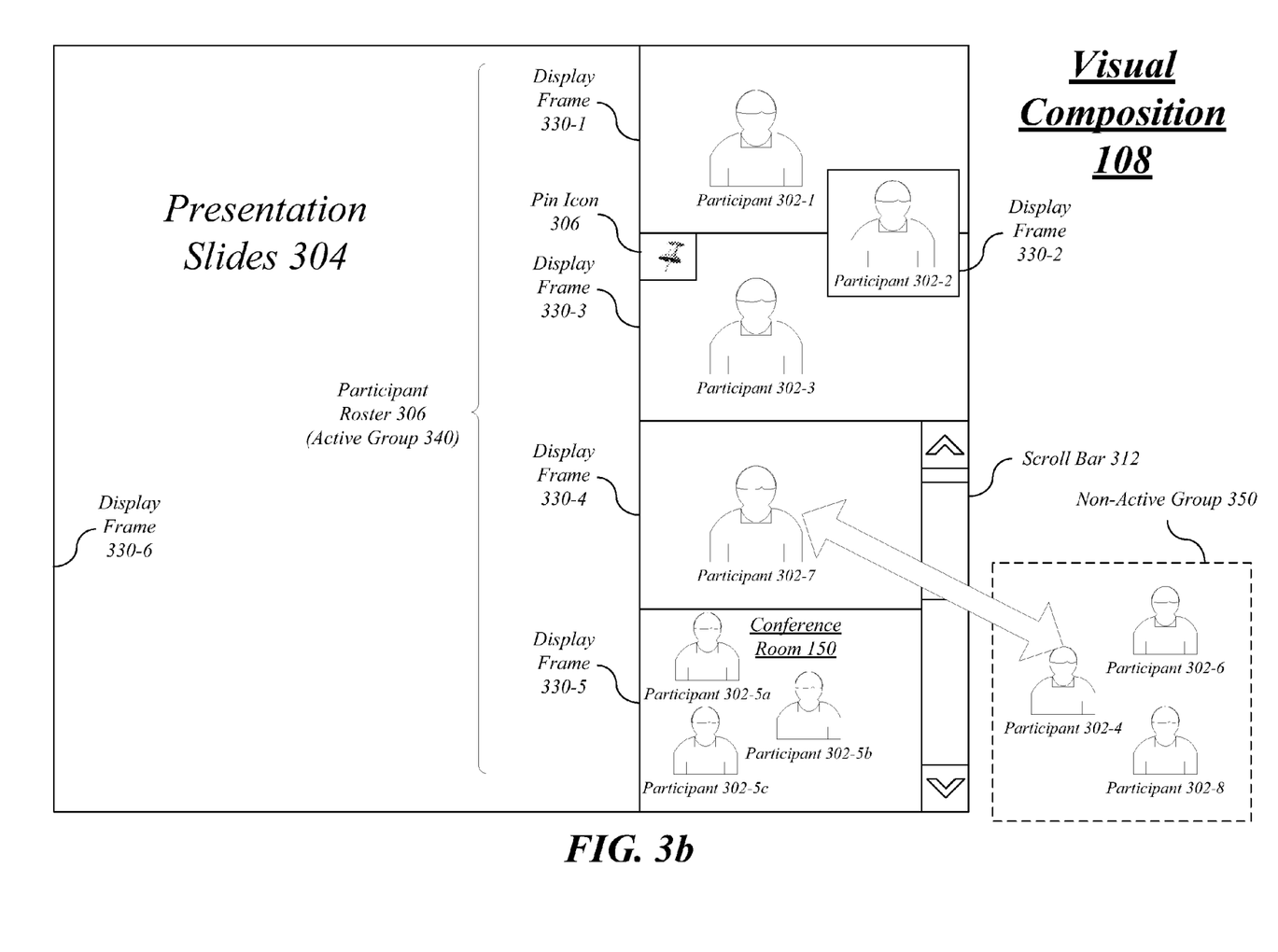
FIG. 3b illustrates an embodiment of a second visual composition.

FIGS. 3$a$, 3$b$ show more detailed illustrations of the visual composition 108. The visual composition 108 may comprise various display frames 330-1-$a$ arranged in a certain mosaic or display pattern for presentation to a viewer, such as an operator of a meeting console 110-1-$m$. Each display frame 330-1-$a$ is designed to render or display multimedia content from the media streams 202-1-$f$ such as video content and/or audio content from a corresponding media stream 202-1-$f$ mapped to a display frame 330-1-$a$ by the MSM module 230.

In the illustrated embodiment shown in FIGS. 3$a$, 3$b$, for example, the visual composition 108 may include a display frame 330-6 comprising a main viewing region to display application data such as presentation slides 304 from presentation application software. Further, the visual composition 108 may include a participant roster 306 comprising the display frames 330-1 through 330-5. The participant roster 306 may be representative of an active group 340. The active group 340 may comprise those participants 302-1 through 302-5 that are currently mapped to a display frame 330-1-$s$. A non-active group 350 may comprise those participants 302-6 through 302-8 not currently mapped to a display frame 330-1-$s$. It may be appreciated that the visual composition 108 may include more or less display frames 330-1-$s$ of varying sizes and alternate arrangements as desired for a given implementation.

The participant roster 306 may comprise multiple display frames 330-1 through 330-5. The display frames 330-1 through 330-5 may provide video content and/or audio content of the participants 302-1-$b$ from the various media streams 202-1-$f$ communicated by the meeting consoles 110-1-$m$. The various display frames 330-1 of the participant roster 306 may be located in a given order from a top of visual composition 108 to a bottom of visual composition 108, such as the display frame 330-1 at a first position near the top, the display frame 330-2 in a second position, the display frame 330-3 in a third position, the display frame 330-4 in a fourth position, and the display frame 330-5 in a fifth position near the bottom. The video content of participants 302-1-$b$ displayed by the display frames 330-1 through 330-5 may be rendered in various formats, such as "head-and-shoulder" cutouts (e.g., with or without any background), transparent objects that can overlay other objects, rectangular regions in perspective, panoramic views, and so forth.

The order for the display frames 330-1-$b$ of the participant roster 306 is not necessarily static. In some embodiments, for example, the order may vary for a number of reasons. For example, an operator may manually configure some or all of the order based on personal preferences. In another example, the media content manager component 114-1-$t$ may automatically modify the order based on participants joining or leaving a given multimedia conference event, modification of display sizes for the display frames 330-1-$a$, changes to spatial or temporal resolutions for video content rendered for the display frames 330-1-$a$, a number of participants 302-1-$b$ shown within video content for the display frames 330-1-*a*, different multimedia conference events, and so forth.

In some cases, the operator or viewer may select a display frame 330-1-*a* to display a particular participant 302-1-*s*, or vice-versa. In response to receiving an operator command, the VCG module 240 may temporarily or permanently assign the selected display frame 330-1-*a* to the desired participant 302-1-*s*. For example, an operator or viewer may desire to assign the display frame 330-3 of the participant roster 306 to the third participant 302-3. A visual indicator such as the pin icon 308 may indicate that the display frame 330-3 is allocated to the third participant 302-3 and will remain mapped to the third participant 302-3 until released.

The MSM module 230 may map decoded media streams to various display frames. Continuing with our previous example, when the total number of decoded media streams is not greater than the total number of display frames in the visual composition 108 (e.g., L<=A), the MSM module 230 may map the decoded media streams to the available display frames. In this case, the video composition 108 may have a sufficient number of available display frames to display all of the participants 154-1-*p* in the decoded media streams for a given multimedia conference event. For example, when there are five available display frames 330-1 through 330-5, and five decoded media streams with participants 302-1 through 302-5 (*a-c*), then the visual composition 108 may display all five decoded media streams in the visual composition 108.

When the total number of decoded media streams is greater than the total number of display frames in the visual composition 108 (e.g., L>A), however, the MSM module 230 may need to map a subset of the total number of decoded media streams to the available display frames. During initialization or at the start of a media conferencing event, the media selection module 260 may select the active group of decoded media streams in any number of different ways as previously described. In the illustrated embodiment shown in FIG. 3*a*, for example, the participants 302-1 through 302-5 are mapped to the corresponding display frames 330-1 through 330-5 to form the active group 340, while the participants 302-6 through 302-8 are not mapped to a corresponding display frame 330-1-*s* and therefore comprise members of the non-active group 350.

The media selection module 260 may select a member of the non-active group 350 of decoded media streams as a non-active replacement candidate to replace a member of the active group 340 of decoded media streams based on speech activity. During the course of a multimedia conference event, assume the participant 302-7 engages in speech activity. The ASD module 220 monitors the decoded media streams to detect when speech activity occurs. When the ASD module 220 detects speech activity for the participant 302-7, the ASD module 220 may send notification to the MSM module 230. Since there are no available display frames 330-1-*s*, however, the MSM module 230 sends a control directive to the media selection module 260 to select a member of the active group 340 for replacement by the speaking member of the non-active group 350. The media selection module 260 may select a member of the active group 340 of decoded media streams as an active replacement candidate to be replaced by the participant 302-7 of the non-active group of decoded media streams based on an activity score for the participant 302-7. Assume the media selection module 260 selects the participant 302-4 as having the lowest activity score of all of the participants 302-1 through 302-5 of the active group 340, and therefore designates the participant 302-4 as the active replacement candidate. For example, the lowest activity score may indicate that the participant 302-4 spoke least recently of all the participants 302-1 through 302-5. It is worthy to note, however, that the media selection module 260 would exclude the participant 302-3 when evaluating activity scores since the operator pinned the participant 302-3 to the display frame 330-3 as indicated by the pin icon 308. The media selection module 260 outputs the selection of participant 302-4 to the MSM 230 as the active replacement candidate. The MSM module 230 may then replace the participant 302-4 from the active group 340 with the non-active replacement candidate from the non-active group 350, which in this case is the participant 302-7. For example, the MSM module 230 may de-allocate the decoded media stream having the participant 302-4 from the display frame 330-4, and map the participant 302-7 to the newly released display frame 330-4 as shown in FIG. 3*b*. The active group 340 now comprises participants 302-1, 302-2, 302-3, 302-5 (*a-c*), and 302-7. The non-active group 350 now comprises participants 302-4, 302-6 and 302-8.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 4:
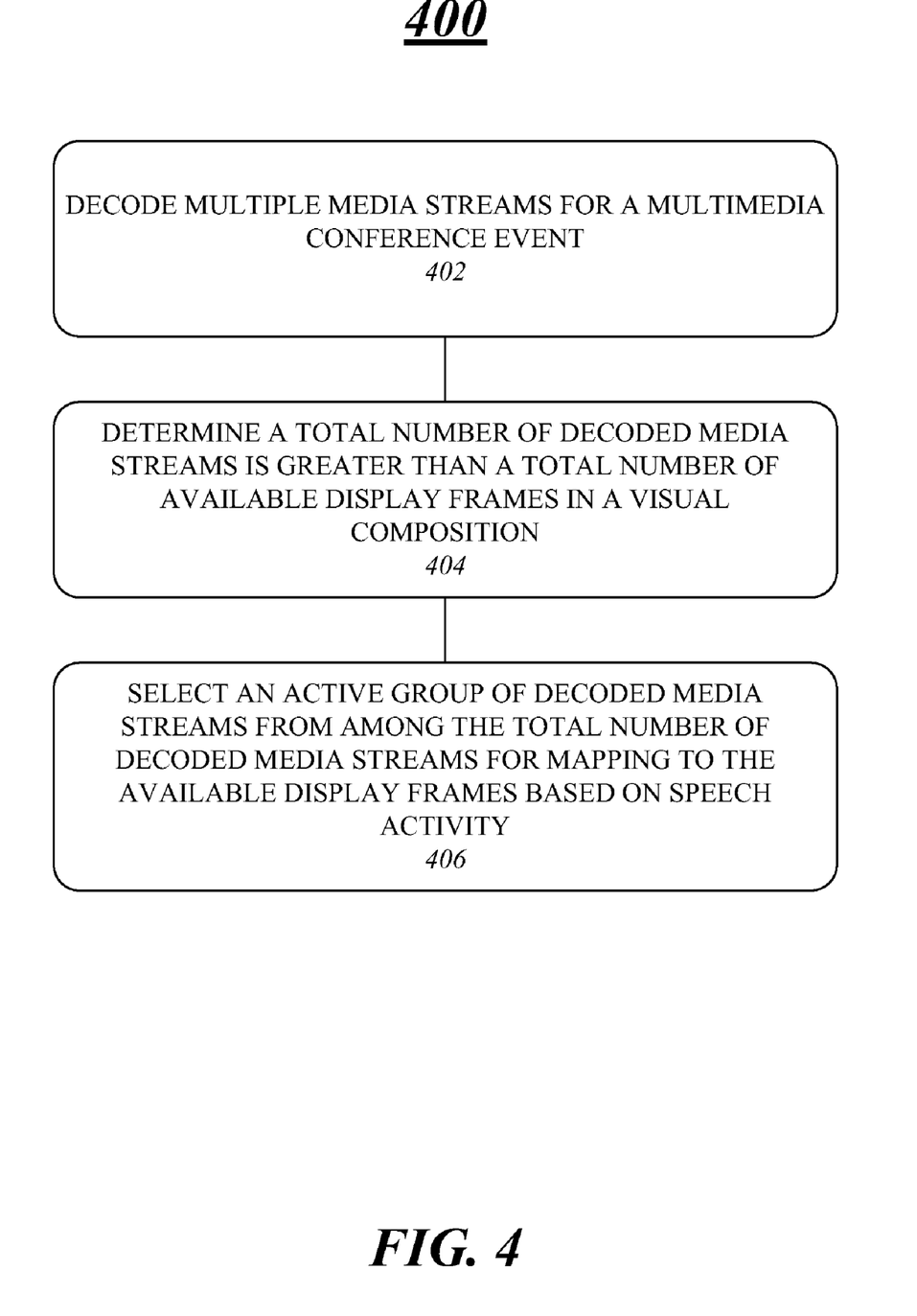
FIG. 4 illustrates an embodiment of a logic flow.

FIG. 4 illustrates one embodiment of a logic flow 400. Logic flow 400 may be representative of some or all of the operations executed by one or more embodiments described herein.

As shown in FIG. 4, the logic flow 400 may decode multiple media streams for a multimedia conference event at block 402. For example, the video decoder module 210 may decode multiple input media streams 202-1-*f* for a multimedia conference event to form the decoded media streams.

The logic flow 400 may determine a total number of decoded media streams is greater than a total number of available display frames in a visual composition at block 404. For example, the MSM module 230 may determine a total number of decoded media streams is greater than a total number of available display frames in a visual composition (e.g., L>A).

The logic flow 400 may select an active group of decoded media streams from among the total number of decoded media streams for mapping to the available display frames based on speech activity at block 406. For example, the media selection module 260 may select an active group of decoded media streams from among the total number of decoded media streams for mapping to the available display frames 330-1-*s* based on speech activity. The speech activity may be represented by various activity scores generated using different scoring algorithms.

Figure 5:
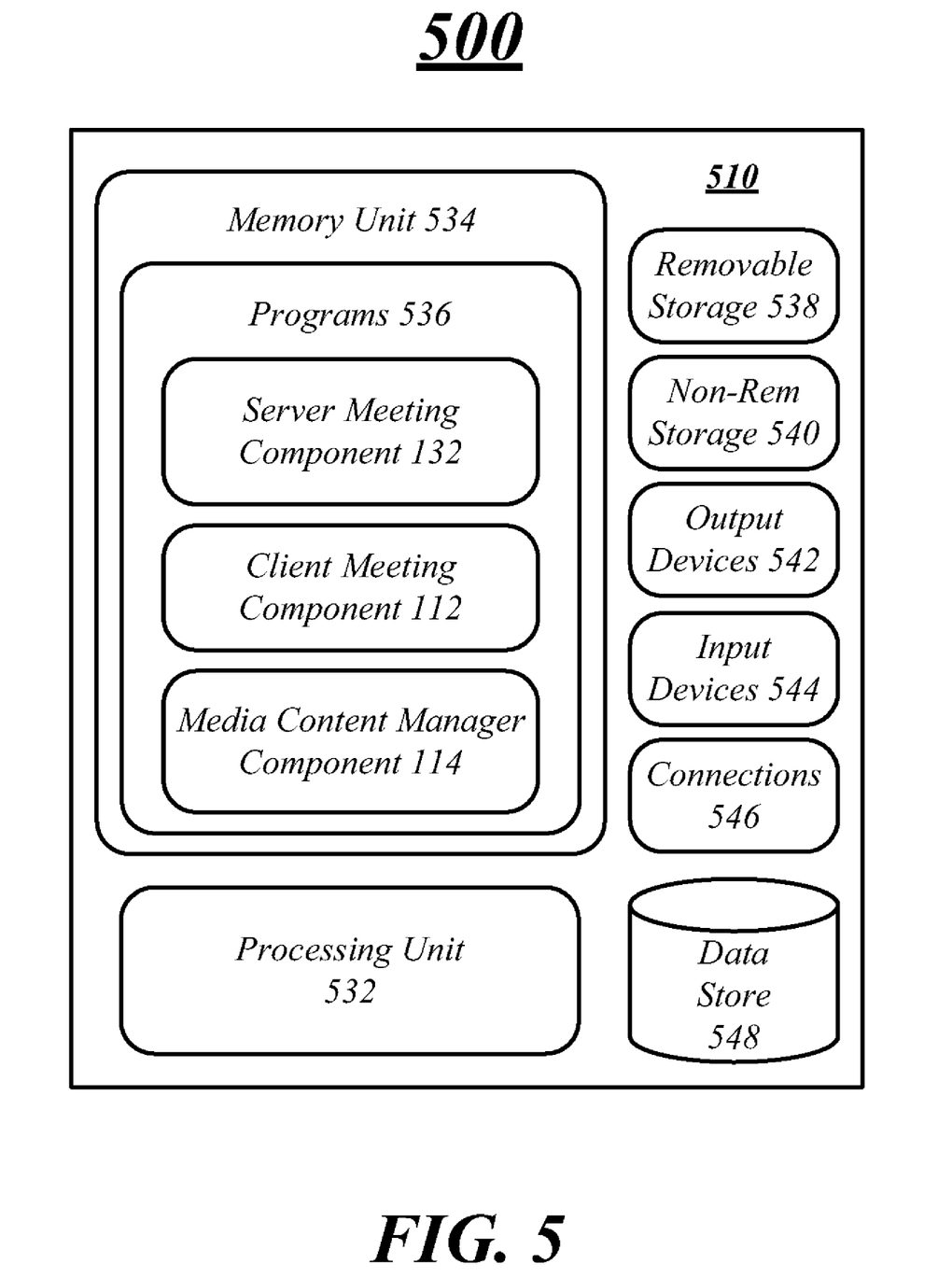
FIG. 5 illustrates an embodiment of a computing architecture.

FIG. 5 further illustrates a more detailed block diagram of computing architecture 510 suitable for implementing the meeting consoles 110-1- or the multimedia conference server 130. In a basic configuration, computing architecture 510 typically includes at least one processing unit 532 and memory 534. Memory 534 may be implemented using any machine-readable or computer-readable media capable of storing data, including both volatile and non-volatile memory. For example, memory 534 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 5, memory 534 may store various software programs, such as one or more application programs 536-1-$t$ and accompanying data. Depending on the implementation, examples of application programs 536-1-$t$ may include server meeting component 132, client meeting components 112-1-$n$, or media content manager component 114.

Computing architecture 510 may also have additional features and/or functionality beyond its basic configuration. For example, computing architecture 510 may include removable storage 538 and non-removable storage 540, which may also comprise various types of machine-readable or computer-readable media as previously described. Computing architecture 510 may also have one or more input devices 544 such as a keyboard, mouse, pen, voice input device, touch input device, measurement devices, sensors, and so forth. Computing architecture 510 may also include one or more output devices 542, such as displays, speakers, printers, and so forth.

Computing architecture 510 may further include one or more communications connections 546 that allow computing architecture 510 to communicate with other devices. Communications connections 546 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

Figure 6:
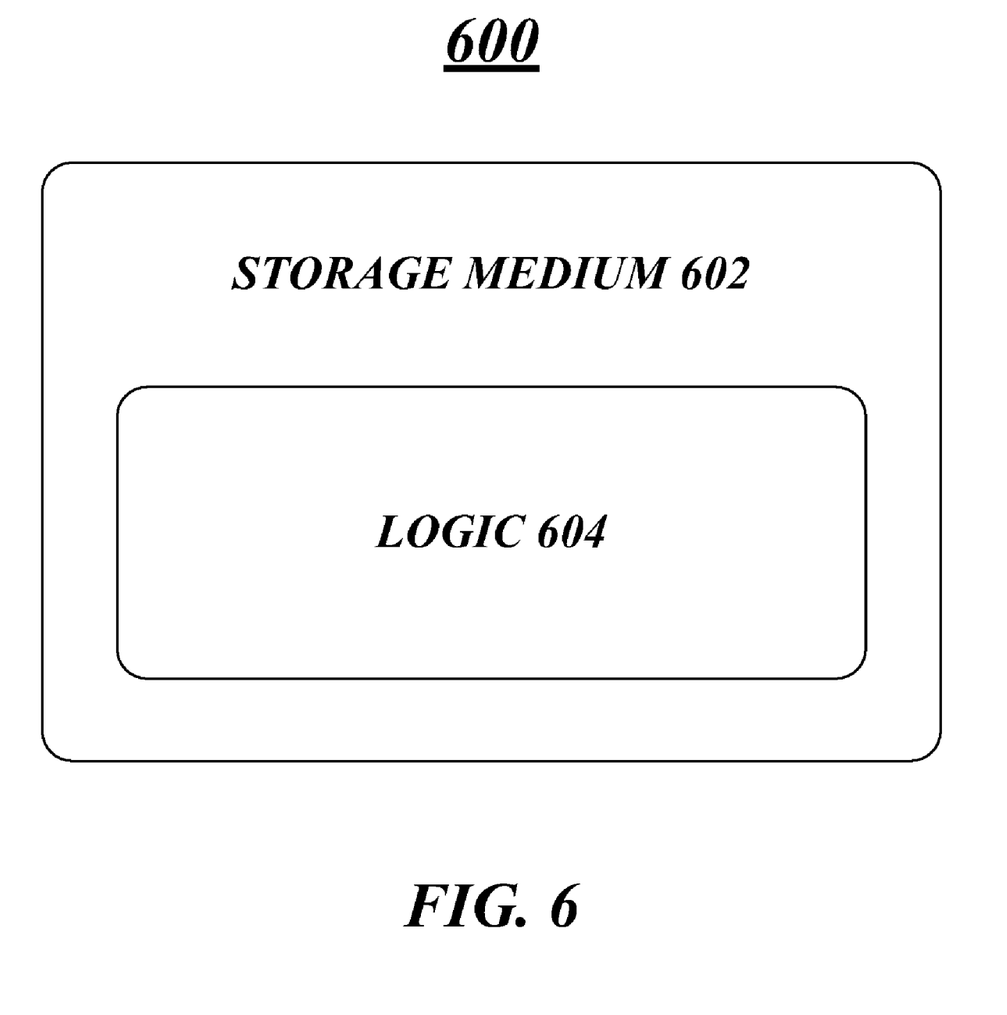
FIG. 6 illustrates an embodiment of an article.

FIG. 6 illustrates a diagram an article of manufacture 600 suitable for storing logic for the various embodiments, including the logic flow 400. As shown, the article of manufacture 600 may comprise a storage medium 602 to store logic 604. Examples of the storage medium 602 may include one or more types of computer-readable storage media capable of storing electronic data, including volatile memory or non-volatile memory, removable or non-removable memory, erasable or non-erasable memory, writeable or re-writeable memory, and so forth. Examples of the logic 604 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article of manufacture 600 and/or the computer-readable storage medium 602 may store logic 604 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
    receiving over a network multiple media streams for a multimedia conference event;
    decoding the multiple media streams;
    calculating a total number of available display frames in a visual composition based at least on technical constraints of the network and viewing constraints of a display;
    determining that a total number of decoded media streams is greater than the total number of available display frames in the visual composition;
    selecting an active group of decoded media streams from among the total number of decoded media streams for mapping to the available display frames based on speech activity;
    generating a first activity score to represent a ratio value of speech activity to non-speech activity, a second activity score to represent a length value for speech activity by a participant, and a third activity score to represent a most recent time for speech activity by a participant; and
    selecting a member of the active group of decoded media streams as an active replacement candidate to be replaced by a member of the non-active group of decoded media streams based on the first, second, or third activity score.

2. The method of claim 1, comprising selecting a member of a non-active group of decoded media streams as a non-active replacement candidate to replace a member of the active group of decoded media streams based on speech activity.

3. The method of claim 1, comprising replacing an active replacement candidate from the active group with a non-active replacement candidate from a non-active group.

4. The method of claim 1, comprising mapping the active group of decoded media streams to the available display frames based on the activity scores, wherein the active group is a subset of the total number of decoded media streams.

5. An article of manufacture comprising a storage medium, wherein the storage medium is not a signal, containing instructions that if executed enable a system to:
    receive over a network multiple media streams for a multimedia conference event;
    decode the multiple media streams;
    calculate a total number of available display frames in a visual composition based at least on technical constraints of the network and viewing constraints of a display;
    determine that a total number of decoded media streams is greater than the total number of available display frames in the visual composition;
    select an active group of decoded media streams from among the total number of decoded media streams for mapping to the available display frames based on speech activity;
    generate a first activity score to represent a ratio value of speech activity to non-speech activity, a second activity score to represent a length value for speech activity by a participant, and a third activity score to represent a most recent time for speech activity by a participant; and
    select a member of the active group of decoded media streams as an active replacement candidate to be replaced by a member of the non-active group of decoded media streams based on the first, second, or third activity score.

6. The article of manufacture of claim 5, further comprising instructions that if executed enable the system to select a member of a non-active group of decoded media streams as a non-active replacement candidate to replace a member of the active group of decoded media streams based on speech activity.

7. The article of manufacture of claim 5, further comprising instructions that if executed enable the system to replace an active replacement candidate from the active group with a non-active replacement candidate from a non-active group.

8. An apparatus, comprising:
    a display;
    a media content manager component communicatively coupled to the display and operative to generate a visual composition for a multimedia conference event, the media content manager component comprising:
        a video decoder module operative to decode multiple media streams for a multimedia conference event;
        a media stream manager module communicatively coupled to the video decoder module, the media stream manager module operative to calculate a total number of available display frames in a visual composition based at least on technical constraints of the network and viewing constraints of the display and determine that a total number of decoded media streams is greater than the total number of available display frames in the visual composition;
        an activity score generating module communicatively coupled to the active speaker detector module, the activity score generating module operative to generate a first activity score to represent a ratio value of speech activity to non-speech activity, a second activity score to represent a length value for speech activity by a participant, and a third activity score to represent a most recent time for speech activity by a participant; and
        a media selection module communicatively coupled to the media stream manager module, the media selection module operative to select an active group of decoded media streams from among the total number of decoded media streams for mapping to the available display frames based on speech activity and select a member of the active group of decoded media streams as an active replacement candidate to be replaced by a member of the non-active group of decoded media streams based on the first, second, or third activity score.

9. The apparatus of claim 8, comprising an active speaker detector module communicatively coupled to the video decoder module, the active speaker detector module operative to detect speech activity for the participants in the decoded media streams.

10. The apparatus of claim 8, the media selection module operative to select a member of a non-active group of decoded media streams as a non-active replacement candidate to replace a member of the active group of decoded media streams based on speech activity.

11. The apparatus of claim 8, the media stream manager module operative to replace an active replacement candidate from the active group with a non-active replacement candidate from a non-active group.

* * * * *